United States Patent
Ono et al.

(10) Patent No.: US 11,764,868 B2
(45) Date of Patent: Sep. 19, 2023

(54) SATELLITE TRANSMITTER AND RELAY SATELLITE COMMUNICATION SYSTEM

(71) Applicant: Mitsubishi Electric Corporation, Tokyo (JP)

(72) Inventors: Hitomi Ono, Tokyo (JP); Akinori Fujimura, Tokyo (JP); Terumi Sunaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 197 days.

(21) Appl. No.: 17/425,322

(22) PCT Filed: Sep. 20, 2019

(86) PCT No.: PCT/JP2019/036951
§ 371 (c)(1),
(2) Date: Jul. 23, 2021

(87) PCT Pub. No.: WO2020/158040
PCT Pub. Date: Aug. 6, 2020

(65) Prior Publication Data
US 2022/0085875 A1    Mar. 17, 2022

(30) Foreign Application Priority Data
Jan. 31, 2019  (JP) ................ 2019-015450

(51) Int. Cl.
*H04L 27/26* (2006.01)
*H04B 7/185* (2006.01)

(52) U.S. Cl.
CPC ..... *H04B 7/18543* (2013.01); *H04B 7/18515* (2013.01); *H04L 27/2621* (2013.01)

(58) Field of Classification Search
None
See application file for complete search history.

(56) References Cited

U.S. PATENT DOCUMENTS 9,516,602 B2 * 12/2016 Kim ............... H04B 7/0639
2017/0187560 A1    6/2017 Ng et al.
(Continued)

FOREIGN PATENT DOCUMENTS

| EP | 2884675 A1 | 6/2015 |
|---|---|---|
| JP | 2011-130367 A | 6/2011 |

OTHER PUBLICATIONS

International Search Report and Written Opinion dated Nov. 5, 2019, received for PCT Application PCT/JP2019/036951, Filed on Sep. 20, 2019, 8 pages including English Translation.
(Continued)

*Primary Examiner* — Kodzovi Acolatse
(74) *Attorney, Agent, or Firm* — XSENSUS LLP

(57) ABSTRACT

A satellite transmitter includes K transmission antenna elements, a multiplexing unit configured to multiplex each of K digital signals on a frequency axis and then convert the multiplexed digital signals to time-domain digital signals, a digital-to-analog converter, a PAPR calculation unit configured to calculate a PAPR for each of the K digital signals, a beam-to-beam relative phase calculation unit configured to calculate a beam-to-beam relative phase for suppressing a peak power of the transmission antenna elements, an excitation coefficient calculation unit configured to calculate K updated excitation coefficients based on the beam-to-beam relative phase and the beam-formation excitation coefficient, and an excitation coefficient multiplication unit configured to generate the digital signals of a frequency domain to be output to the multiplexing unit by multiplying a received relay signal by each of the K updated excitation coefficients in the frequency domain.

12 Claims, 11 Drawing Sheets

(56) References Cited

U.S. PATENT DOCUMENTS

| | | | | |
|---|---|---|---|---|
| 2019/0245725 A1* | 8/2019 | Sahin | ............... | H04L 5/0007 |
| 2020/0091608 A1* | 3/2020 | Alpman | ............ | H01Q 21/24 |
| 2020/0295975 A1* | 9/2020 | Li | ........................ | H03F 1/32 |
| 2021/0021331 A1* | 1/2021 | Wyler | ............. | H04B 7/0486 |
| 2022/0029697 A1* | 1/2022 | Bakr | ................ | H04B 7/0695 |
| 2022/0077911 A1* | 3/2022 | Sergeev | .......... | H04B 7/0658 |

OTHER PUBLICATIONS

Cimini et al., "Peak-to-Average Power Ratio Reduction of an OFDM Signal Using Partial Transmit Sequences", IEEE Communications Letters, vol. 4, No. 3, Mar. 2020, pp. 86-88.
Extended European search report dated Mar. 11, 2022, in corresponding European patent Application No. 19912839.8, 15 pages.
Alberto Mengali et al., "Low Complexity Transmit Processing for Multibeam Satellite Systems with Non-Linear Channels", IEEE, 2016, total 7 pages.

\* cited by examiner

SATELLITE TRANSMITTER AND RELAY SATELLITE COMMUNICATION SYSTEM

CROSS-REFERENCE TO RELATED APPLICATIONS

The present application is based on PCT filing PCT/JP2019/036951, filed Sep. 20, 2019, which claims priority to JP 2019-015450, filed Jan. 31, 2019, the entire contents of each are incorporated herein by reference.

TECHNICAL FIELD

The present invention relates to a satellite transmitter and a relay satellite communication system which are configured to suppress a peak power of a transmission antenna element.

BACKGROUND ART

Along with an increase in communication capacity, there is a demand for satellite communication systems that flexibly control communication traffic. To control an area flexibility for optimizing the communication traffic, there is a beam forming network (BFN) for forming transmission beams and reception beams by controlling excitation coefficients of a plurality of antennas, that is, amplitudes and phases thereof.

Beam forming methods include microwave beam forming (MBF) using a phase shifter for microwaves, and digital beam forming (DBF) that adopts digital signal processing to control excitation coefficients. The digital beam forming enables beams to be integrated compared with the microwave beam forming, and hence the number of beams can be increased.

For example, as a digital beam forming method, there is a technology relating to a relay device configured to form beams by frequency-dividing a received beam and then perform a product-sum calculation using a weighting coefficient for each beam with a digital beam former (for example, refer to Patent Literature 1).

With the configuration of the relay device described in Patent Literature 1, DBF operation is not performed with respect to frequencies not assigned to input signals, to thereby save power consumption during digital processing. Further, the digital beam forming method used in the relay device described in Patent Literature 1 can be applied as it is to transmission beams, and the same effect can be expected for transmitters as well.

The related-art relay device described in Patent Literature 1 has a function of forming beams by adopting the above-mentioned configuration and setting an excitation coefficient corresponding to a beam in each element for each band of each beam regardless of a modulation method. Moreover, the related-art relay device described in Patent Literature 1 can form beams in a flexible manner even when the band occupied by the beam changes.

Further, regarding a method of transmitting and receiving a multi-carrier signal, it is known that, when a large number of subcarriers are transmitted at the same time, the amplitude of the transmitted signal fluctuates greatly depending on a phase relationship among those subcarriers.

In general, a transmitter includes an amplifier configured to amplify transmission power. However, when the amplitude fluctuation is large, it is required to increase a backoff margin in order to avoid non-linear distortion due to the use of a non-linear region in the amplifier. This suppresses an available dynamic range of the amplifier.

Examples of modulation methods in which such a problem occurs and the amplitude fluctuates greatly include orthogonal frequency-division multiplexing (OFDM). In this modulation method, a method of lowering a peak-to-average power ratio (PAPR) for the transmitter is considered to be the related art.

Examples of a PAPR suppression method in an OFDM transmitter include a clipping method, a filtering method, and a partial transmit sequence (PTS) method. The PTS method is considered to be an advantageous method in that peak suppression can be performed without causing distortion of the transmitted signal (for example, refer to Non Patent Literature 1).

In the PTS method, multicarriers are divided into several clusters in a frequency domain, and the divided multicarriers are corrected from the frequency domain to a time domain by inverse fast Fourier transformation (IFFT). Further, in the PTS method, the PAPR can be suppressed by setting an appropriate phase among the clusters in the time domain and then multiplexing the clusters. In the PTS method, by sharing the phase assigned among the clusters with the receiver side, the all of the multicarriers can be restored at the time of demodulation.

CITATION LIST

Patent Literature

[PTL 1] JP 2011-130367 A

Non Patent Literature

[NPL 1] L. J. Cimini and N. R. Sollenberger, "Peak-to-Average power ratio reduction of an OFDM signal using partial transmit sequences," IEEE Commun. Lett, vol. 4, no. 3, pp. 86-88, March, 2000

SUMMARY OF INVENTION

Technical Problem

However, the related art has the following problems.

In the related-art relay device of Patent Literature 1, an excitation coefficient can be set independently for each element and each beam. Through control of the excitation coefficient to be multiplied by each element, the phase of the combined wave plane emitted from the transmitting antenna array is controlled, and a beam is formed.

That is, in the related-art relay device of Patent Literature 1, beam formation can be performed by setting an excitation coefficient corresponding to the beam in each element for each beam band regardless of the modulation method. However, when a specific element is focused on, in the related-art relay device of Patent Literature 1, the signals of all the bands forming different beams pass through the same element, and like a multicarrier transmitter, the PAPR increases. Therefore, it is required to set a large backoff margin of the transmission amplifier. As a result, with the related-art relay device of Patent Literature 1, there is a problem in that the transmission power is limited.

Further, in a PTS method like that described in Non Patent Literature 1, there is a problem in that, when a multicarrier by a single receiver is demodulated, it is required to share the phase control information given among the clusters to suppress the PAPR from the transmitter side to the receiver side by another method.

The present invention has been made to solve the above-mentioned problems, and an object of the present invention is to provide a satellite transmitter and a relay satellite communication system in which limitation of transmission power is suppressed, and in which phase control information is not required to be shared between a transmitter side and a receiver side.

Solution to Problem

According to one embodiment of the present invention, there is provided a satellite transmitter including: K transmission antenna elements configured to emit transmission beams each having a different frequency from each other to any of one or more points on ground based on each of K analog signals; a multiplexing unit configured to multiplex, by using K digital signals of a frequency domain demultiplexed for each frequency as inputs, each of the K digital signals on a frequency axis and then convert the multiplexed digital signals to time-domain digital signals, the number K corresponding to the number of the transmission antenna elements; a digital-to-analog converter configured to convert each of the K digital signals to the analog signal; a storage device configured to store K excitation coefficients for forming the transmission beams as beam-formation excitation coefficients; a PAPR calculation unit configured to calculate, as a PAPR, a peak-to-average power ratio for each of the K digital signals converted by the multiplexing unit; a beam-to-beam relative phase calculation unit configured to calculate a beam-to-beam relative phase for suppressing a peak power of the transmission antenna elements based on the K PAPRs; an excitation coefficient calculation unit configured to calculate K updated excitation coefficients based on the beam-to-beam relative phase and the beam-formation excitation coefficients; and an excitation coefficient multiplication unit configured to generate the digital signals of the frequency domain to be output to the multiplexing unit by multiplying a received relay signal by each of the K updated excitation coefficients in the frequency domain.

Further, according to one embodiment of the present invention, there is provided a satellite transmitter including: K transmission antenna elements configured to emit transmission beams to M points spatially different on ground based on each of K analog signals; a multiplexing unit configured to multiplex, by using K digital signals of a frequency domain demultiplexed for each frequency as inputs, each of the K digital signals on a frequency axis and then convert the multiplexed digital signals to time-domain digital signals, the number K corresponding to the number of the transmission antenna elements; a digital-to-analog converter configured to convert each of the K digital signals to the analog signal; a storage device configured to store K excitation coefficients for forming the transmission beams as beam-formation excitation coefficients; a PAPR calculation unit configured to calculate, as a PAPR, a peak-to-average power ratio for each of the K digital signals converted by the multiplexing unit; a beam-to-beam relative phase calculation unit configured to calculate a beam-to-beam relative phase for suppressing a peak power of the transmission antenna elements based on the K PAPRs; an excitation coefficient calculation unit configured to calculate K updated excitation coefficients based on the beam-to-beam relative phase and the beam-formation excitation coefficients; and an excitation coefficient multiplication unit configured to generate the digital signals of the frequency domain to be output to the multiplexing unit by multiplying a received relay signal by each of the K updated excitation coefficients in the frequency domain, wherein the satellite transmitter includes M DBF transmission units each including the storage device, the excitation coefficient calculation unit, and the excitation coefficient multiplication unit, wherein the relay signal is configured as individual M relay signals, wherein the M DBF transmission units are configured to output M digital signals of the frequency domain based on each of the individual M relay signals, wherein the multiplexing unit is configured to generate added-up K digital signals obtained by adding up the M digital signals of the frequency domain for each frequency, multiplex each of the added-up K digital signals on the frequency axis, and to then convert the multiplexed digital signals to time-domain digital signals, and wherein the beam-to-beam relative phase calculation unit is configured to output the calculated beam-to-beam relative phase to each of the M DBF transmission units.

Further, according to one embodiment of the present invention, there is provided a relay satellite communication system including: a ground gateway station, a communication control station, and a ground satellite control station which are arranged on ground; and a satellite relay device including a satellite receiver and a satellite transmitter, wherein the communication control station is configured to: generate a relay signal, and calculate for the generated relay signal, as a PAPR, a peak-to-average power ratio for each time-domain digital signal of each transmission antenna element arranged in the satellite transmitter; calculate a beam-to-beam relative phase for suppressing a peak power of the transmission antenna elements based on the PAPR; determine a beam-formation excitation coefficient of a transmission beam emitted from the satellite transmitter based on the beam-to-beam relative phase; and calculate an updated excitation coefficient by updating the beam-formation excitation coefficient based on the beam-to-beam relative phase and the beam-formation excitation coefficient, wherein the ground gateway station is configured to transmit the relay signal generated by the communication control station to the satellite receiver, wherein the ground satellite control station is configured to transmit the updated excitation coefficient generated by the communication control station to the satellite transmitter, wherein the satellite receiver is configured to generate a digital signal of a frequency domain demultiplexed for each frequency from the relay signal received from the ground gateway station, and wherein the satellite transmitter includes: K transmission antenna elements configured to emit transmission beams each having a different frequency from each other to any of one or more points on the ground based on each of K analog signals; a multiplexing unit configured to multiplex, by using K digital signals of an updated frequency domain as inputs, each of the K digital signals on a frequency axis and then convert the multiplexed digital signals to time-domain digital signals, the number K corresponding to the number of the transmission antenna elements; a digital-to-analog converter configured to convert each of the K digital signals to the analog signal; and an excitation coefficient multiplication unit configured to generate the digital signals of the updated frequency domain to be output to the multiplexing unit by receiving the updated excitation coefficient from the ground satellite control station and multiplying the digital signals of the frequency domain generated by the satellite receiver by the updated excitation coefficient in the frequency domain.

Advantageous Effects of Invention

According to the present invention, the beam-to-beam relative phase for suppressing the peak power of the transmission antenna element is calculated based on the calculation result of the PAPR, and the excitation coefficient is updated by using the calculated beam-to-beam relative phase. As a result, it is possible to provide the satellite transmitter and the relay satellite communication system in which limitation of the transmission power is suppressed, and in which the phase control information is not required to be shared between the transmitter side and the receiver side.

In order to describe the present invention in more detail, modes for carrying out the present invention are described below with reference to the accompanying drawings.

DESCRIPTION OF EMBODIMENTS

First Embodiment

<Configuration>

Figure 1:
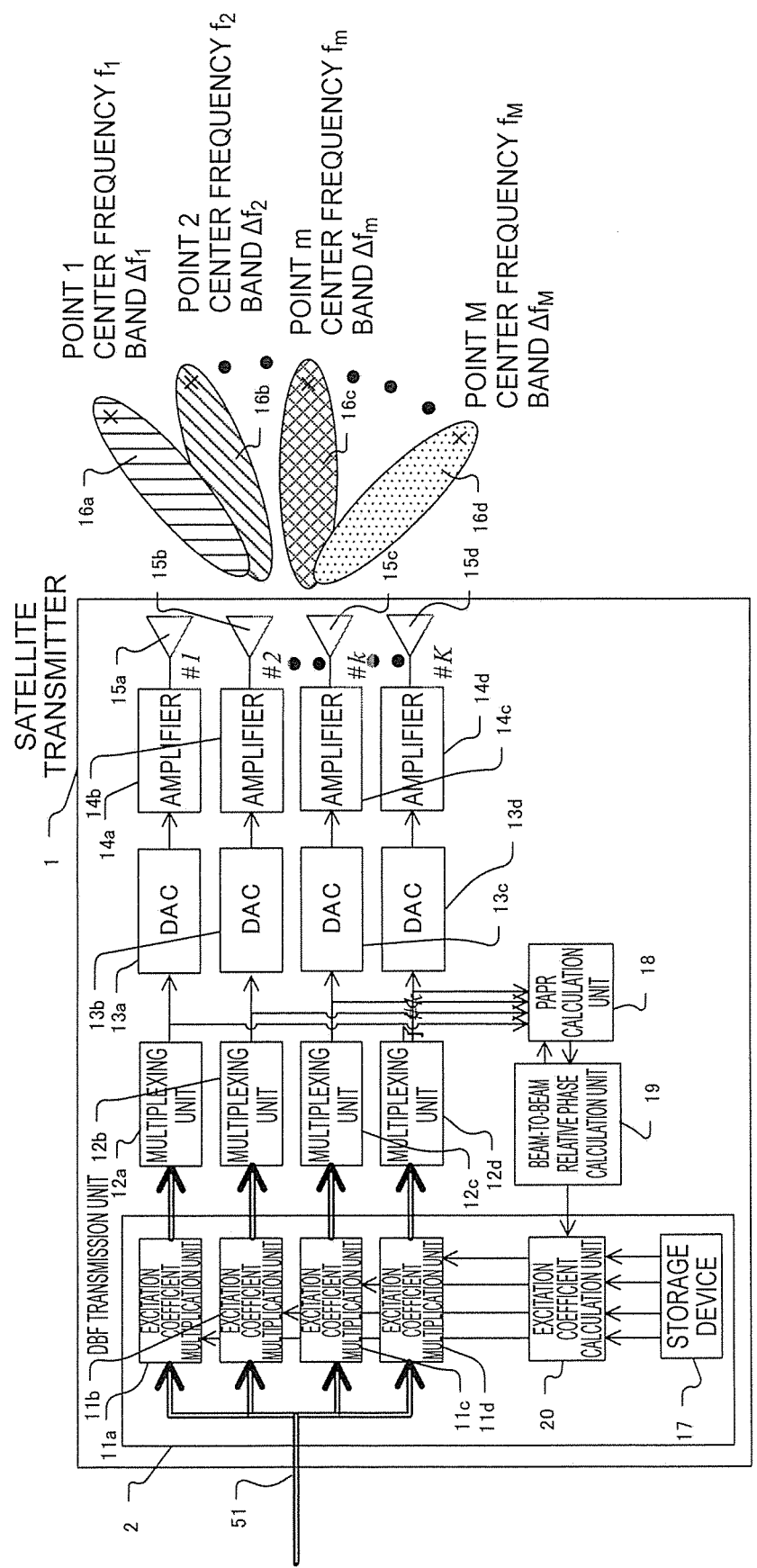
FIG. 1 is a diagram for illustrating an internal configuration of a satellite transmitter according to a first embodiment of the present invention.

FIG. 1 is a diagram for illustrating an internal configuration of a satellite transmitter according to a first embodiment of the present invention. The purpose of the satellite transmitter according to the first embodiment illustrated in FIG. 1 is to simultaneously transmit transmission beams 16a to 16d as communication signals to one or more points "m". Here, "m" is represented as, when M is an integer of 1 or more, m=1 to M.

Each of the transmission beams 16 to 16d has the following meaning.

Transmission beam 16a: Transmission beam to point 1
Transmission beam 16b: Transmission beam to point 2
Transmission beam 16c: Transmission beam to point m
Transmission beam 16d: Transmission beam to point M A satellite transmitter 1 includes a DBF transmission unit 2, multiplexing units 12a to 12d, digital-to-analog converter (hereinafter referred to as "DACs") 13a to 13d, amplifiers 14a to 14d, transmission antenna elements 15a to 15d, a PAPR calculation unit 18, and a beam-to-beam relative phase calculation unit 19. Further, the DBF transmission unit 2 includes excitation coefficient multiplication units 11a to 11d, a storage device 17, and an excitation coefficient calculation unit 20.

Each of the excitation coefficient multiplication units 11a to 11d included in the DBF transmission unit 2 is configured to multiply a received relay signal 51 by an excitation coefficient in a frequency domain. The multiplexing units 12a to 12d are configured to multiplex relay signals which have been multiplied by the excitation coefficient and then demultiplexed for each frequency with the signal in the time domain.

The DACs 13a to 13d are configured to convert the relay signals which have been multiplexed by the multiplexing units 12a to 12d from a digital signal to an analog signal. The amplifiers 14a to 14d are configured to amplify the relay signals which have been converted to analog signals by the DACs 13a to 13d. The transmission antenna elements 15a to 15d are formed as a number of elements K. Here, K is an integer of 1 or more. The transmission antenna elements 15a to 15d are configured to emit the relay signals amplified by the amplifiers 14a to 14d into the air as radio waves.

The PAPR calculation unit 18 is configured to calculate a PAPR, which is a peak-to-average power ratio of each relay signal multiplexed by the multiplexing units 12a to 12d. The beam-to-beam relative phase calculation unit 19 is configured to determine the relative phase between beams based on the information on the PAPR calculated by the PAPR calculation unit 18.

The storage device 17 included in the DBF transmission unit 2 is a memory configured to store the excitation coefficient to be used for beam formation. The excitation coefficient calculation unit 20 included in the DBF transmission unit 2 is configured to calculate an updated excitation coefficient from the phase information on the beams determined by the beam-to-beam relative phase calculation unit and the beam-formation excitation coefficient stored in the storage device 17. Each of the excitation coefficient multiplication units 11a to 11d performs the multiplication processing on the relay signal 51 by using the excitation coefficient updated by the excitation coefficient calculation unit 20.

Through inclusion of the configuration of FIG. 1, the satellite transmitter 1 according to the first embodiment has a function of improving the output of the transmission beams 16a to 16d by suppressing the PAPR of the signals input to the amplifiers 14a to 14d and reducing the backoff of the amplifiers 14a to 14d.

<Operation>

Next, the specific operation of the satellite transmitter 1 according to the first embodiment is described. The specific operation is described under the following conditions.

There are 1 to M points, that is, M points simultaneously transmitting communication signals from the satellite transmitter 1.

There are 1 to K transmission antenna elements, that is, K transmission antenna elements 15a to 15d.

For the transmission beams 16a to 16d output as communication signals from the satellite transmitter 1, a center frequency of the beam transmitted to the point "m" is "fm", and a band is Δfm.

Point 1 to point M receiving the communication signals output from the satellite transmitter 1 are any point on the ground covered by an emission pattern by the M transmission beams 16a to 16d.

Figure 2:
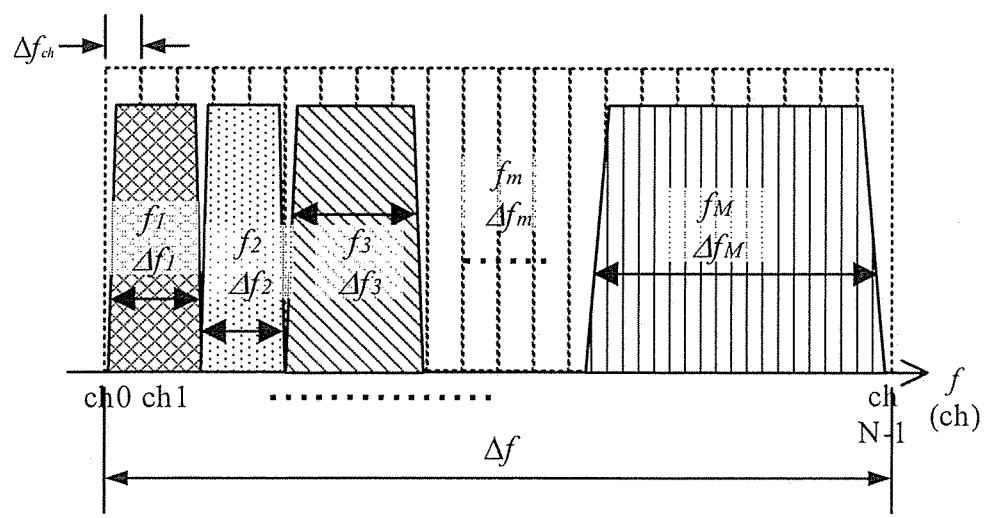
FIG. 2 is a schematic diagram of a relay signal input to the satellite transmitter according to the first embodiment of the present invention.

FIG. 2 is a schematic diagram of the relay signal 51 input to the satellite transmitter 1 according to the first embodiment of the present invention. The relay signal 51 is a digital signal, and is a signal obtained by demultiplexing a signal having a total band Δf at a resolution of a band Δfch. The band Δfch having the minimum resolution is referred to as "sub-channel." Each sub-channel has a digital value for amplitude and phase. In the following description, the number of sub-channels is N channels. Here, N is an integer of 1 or more.

Further, as shown in FIG. 2, it is assumed that the relay signals transmitted as a total of M transmission beams 16a to 16d are band-divided and included in the total band Δf. In FIG. 2, there is exemplified a case in which the band corresponding to each beam occupies a subchannel in order of beam number. However, it is not required that the bands corresponding to each of the beams be in the order shown in FIG. 2. Moreover, it is only required that the total of the band of all the beams be equal to or less than the total band Δf, and it is not required to completely occupy the total band Δf.

Further, in FIG. 1, there is illustrated a case in which there is one DBF transmission unit 2. In this case, it is assumed that each of the M transmission beams 16a to 16d does not share the same subchannel. That is, it is assumed that the beams always have different frequencies from each other.

When the relay signal 51 is written as a vector X, the relay signal 51 is as shown in the following Expression (1).

$$X = (X_0\ X_1\ X_2\ \ldots\ X_{N-1})^T \quad (1)$$
$$= (X_{0,m}\ X_{1,m}\ X_{2,m}\ \ldots\ X_{N-1,m})^T\ (m = 1\sim M)$$
$$= (X_1\ X_2 \ldots X_m \ldots X_M)^T$$

As shown in Expression (1), when n=0 to N−1, Xn is the complex amplitude of the subchannel "n". The complex amplitude of the subchannel "n" belonging to the beam "m" is represented by "Xn, m". Further, a cluster corresponding to a complex amplitude set of the subchannels forming the beam "m" is represented by the vector "Xm".

Figure 3:
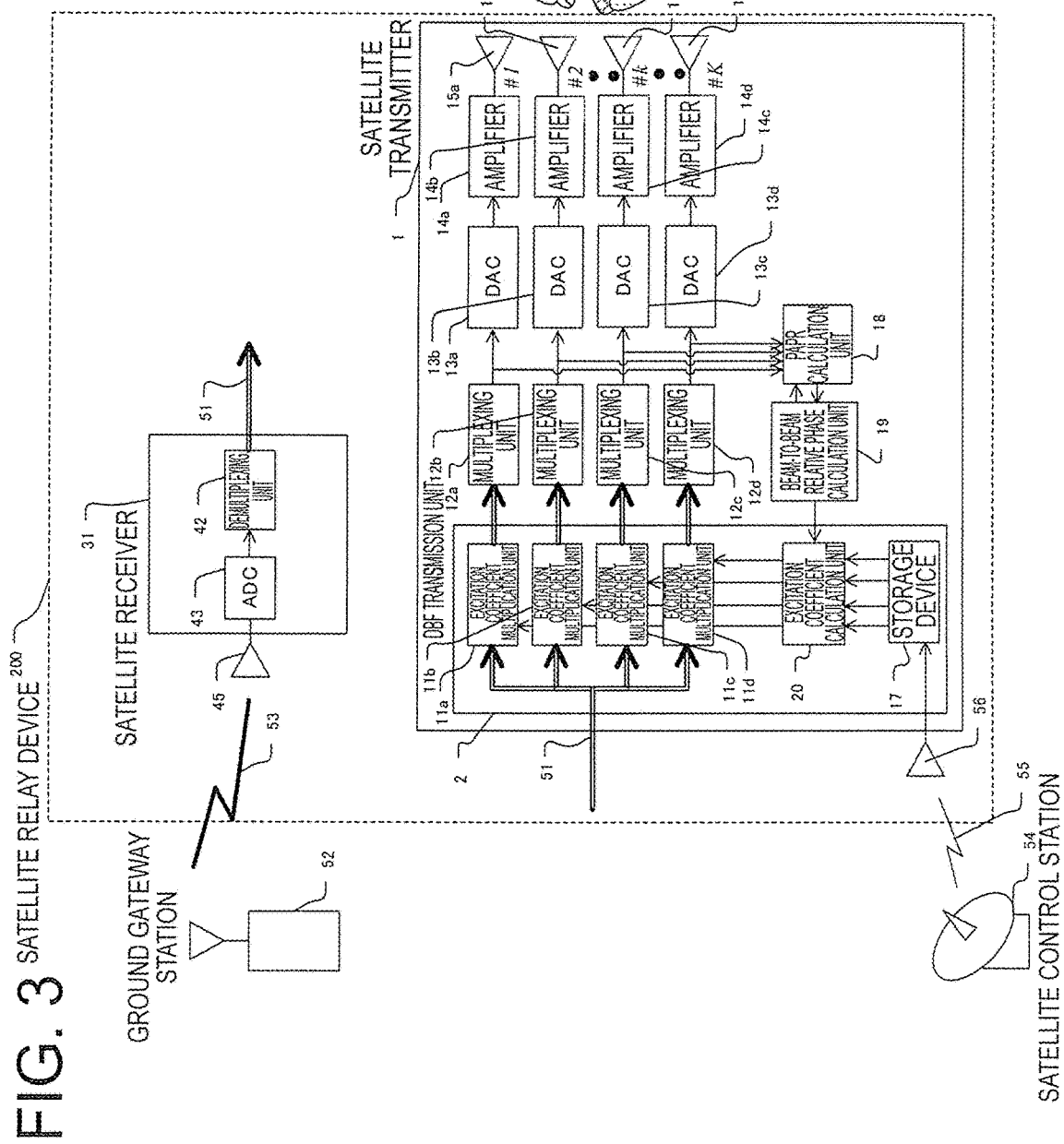
FIG. 3 is a diagram for illustrating a first configuration example in which a relay signal is input from a satellite receiver to the satellite transmitter according to the first embodiment of the present invention.

FIG. 3 is a diagram for illustrating a first configuration example in which the relay signal 51 is input from a satellite receiver 31 to the satellite transmitter 1 according to the first embodiment of the present invention. Specifically, FIG. 3 is an illustration of a configuration in which a relay signal 51 generated by the satellite receiver 31 is input to the satellite transmitter 1 based on a relay signal 53 transmitted from a ground gateway station 52.

The ground gateway station 52 is configured to allocate the data to be transmitted to M points by the satellite transmitter 1 to M clusters in the total band Δf as in Expression (1), and to transmit the data to the satellite receiver 31 as real-time data.

The satellite receiver 31 includes a reception antenna 45, an ADC 43, and a demultiplexing unit 42. The ADC 43 is configured to generate a real-time digital signal by analog-to-digital conversion (ADC) of the relay signal 53 received via the reception antenna 45.

The demultiplexing unit 42 is configured to generate the relay signal 51 by demultiplexing the digitally converted real-time digital signal to the band Δfch, which is a sub-channel of the frequency domain. The relay signal 51 generated by demultiplexing can be expressed as Expression (1).

A ground satellite control station 54 is configured to transmit information on a beam-formation excitation coefficient relating to transmission beam formation of the relay signal 51 to the satellite transmitter 1 as a command signal 55. Meanwhile, the satellite transmitter 1 stores the command signal received by a command reception antenna 56 in the storage device 17.

With such a configuration, the relay signal 51 and the beam-formation excitation coefficient required for setting the transmission beams are controlled from the ground. The details of the beam-formation excitation coefficient are described later.

Figure 4:
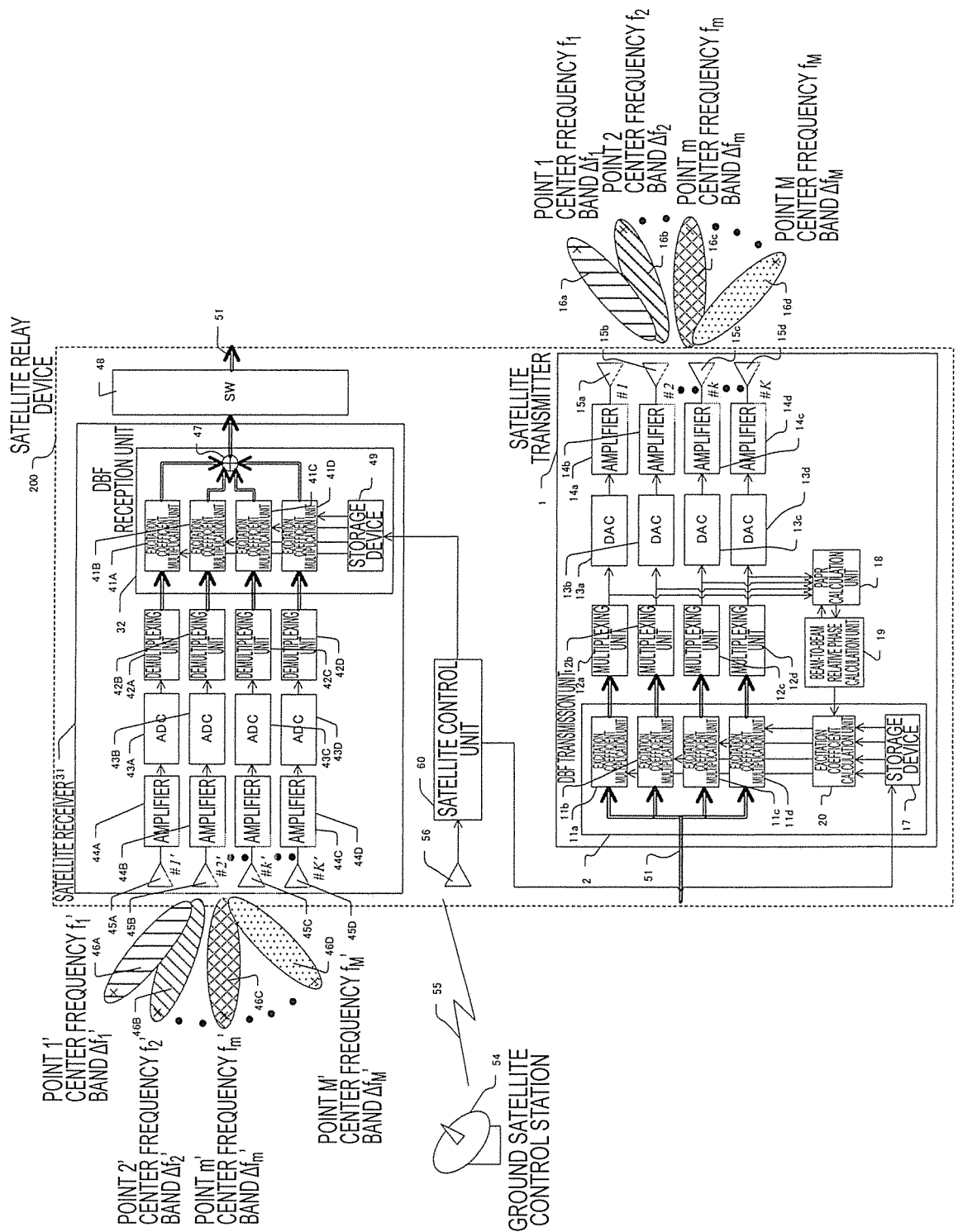
FIG. 4 is a diagram for illustrating a second configuration example in which the relay signal is input from the satellite receiver to the satellite transmitter according to the first embodiment of the present invention.

Next, FIG. 4 is a diagram for illustrating a second configuration example in which the relay signal 51 is input from the satellite receiver 31 to the satellite transmitter 1 according to the first embodiment of the present invention. Specifically, in FIG. 4, there is illustrated a configuration in which a relay signal 51 generated by the satellite receiver 31 by receiving beams transmitted from a plurality of ground stations as reception beams 46A to 46D is input to the satellite transmitter 1.

A satellite relay device 200 illustrated in FIG. 4 includes a satellite receiver 31, a switch 48, a satellite transmitter 1, a command reception antenna 56, and a satellite control unit 60.

The satellite receiver 31 includes a DBF reception unit 32, demultiplexing units 42A to 42D, analog-to-digital converters (hereinafter referred to as "ADCs") 43A to 43D, amplifiers 44A to 44D, reception antenna elements 45A to 45D, and a vector combiner 47. Further, the DBF reception unit 32 includes excitation coefficient multiplication units 41A to 41D and a storage device 49.

The satellite relay device 200 illustrated in FIG. 4 is configured to simultaneously receive reception beams 46A to 46D, which are communication signals from M' points 1' to M'. The satellite relay device 200 switches the various communication signals and combines or separates bands. The purpose of the satellite relay device 200 is to then form M new beams 16a to 16d, and transmit the formed M transmission beams 16a to 16d to new recipients of point 1 to point M on the ground.

The specific operation of the satellite receiver 31 based on FIG. 4 is now described under the following conditions.

The satellite relay device 200 forms a reception beam for each of a plurality of ground stations by using individual DBFs.

Similarly to the transmission beams, for the reception beams 46A to 46D, which are communication signals, the center frequency of the beam transmitted from the point m' is fm', and the band is Δfm'.

The point 1' to the point M' at which the ground transmission stations are located may be any point on the ground covered by the emission pattern by M' reception beams 46A to 46D.

The satellite receiver 31 includes K' reception antenna elements 45A to 45D, and forms the reception beams by using the reception antenna elements 45A to 45D.

The total band of the formed reception beams is within the total band Δf of the transmission beams.

The amplifiers 44A to 44D are configured to amplify each signal received by the reception antenna elements 45A to 45D. The ADCs 43A to 43D are configured to convert each analog signal amplified by the amplifiers 44A to 44D to a real-time digital signal.

The demultiplexing units 42A to 42D are configured to demultiplex the digitally-converted real-time digital signals into subchannels of the band Δfch in the frequency domain. The excitation coefficient multiplication units 41A to 41D included in the DBF reception unit 32 are configured to multiply the signals demultiplexed by the demultiplexing units 42A to 42D by the excitation coefficient for reception beam formation stored in the storage device 49.

The vector combiner 47 is configured to combine the vectors of the signals multiplied by the excitation coefficient multiplication units 41A to 41D for each subchannel. As a result, the signal in the reception beam direction is restored.

Figure 5:
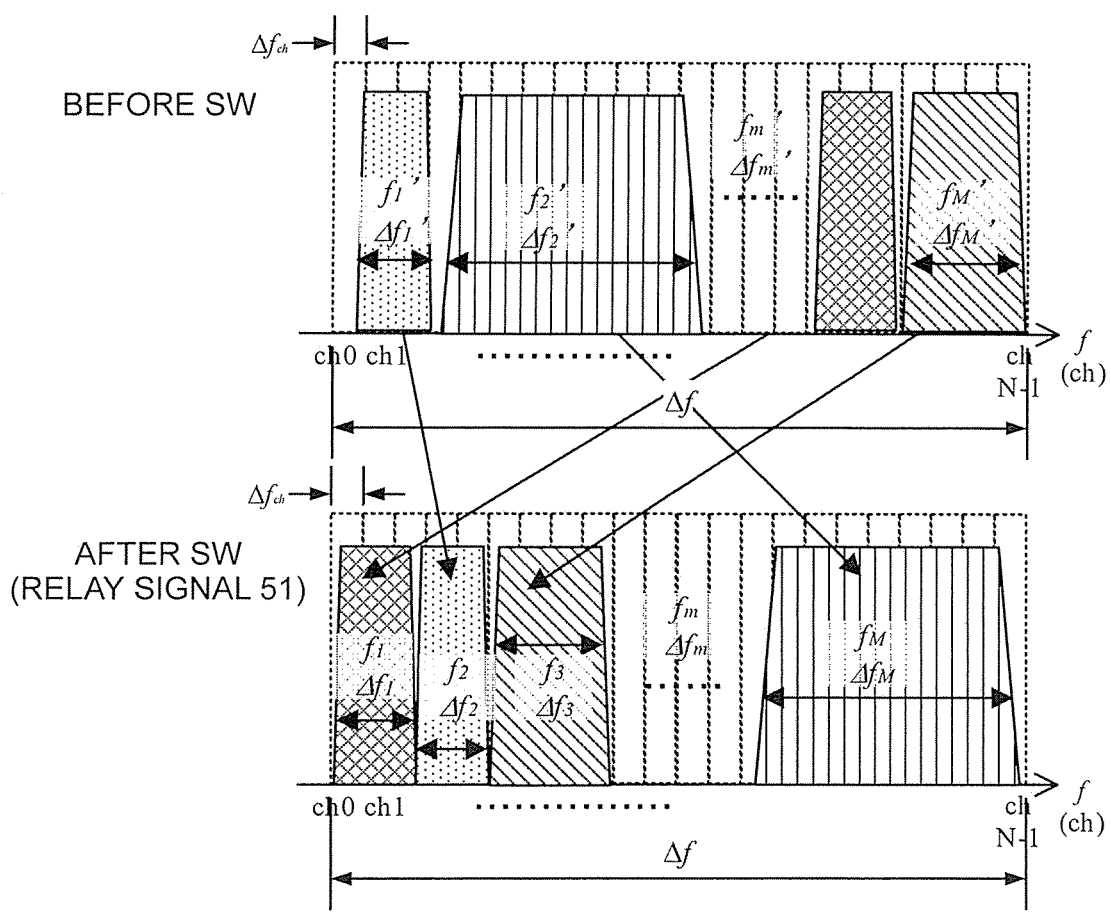
FIG. 5 is a conceptual diagram for illustrating a switch function in the first embodiment of the present invention.

Next, the operation of the switch 48 arranged between the satellite receiver 31 and the satellite transmitter 1 is described. FIG. 5 is a conceptual diagram for illustrating a function of the switch 48 in the first embodiment of the present invention. The switch 48 has a function of switching the signals demultiplexed for each subchannel among the subchannels.

Therefore, a subchannel can be switched between reception beams and transmission beams by the operation of the switch 48. The relay signal 51 is formed by the subchannel switching function of the switch 48, and the formed relay signal 51 is output to the satellite transmitter 1.

In FIG. 5, there is exemplified a case in which the reception beams and the transmission beams have a one-to-one correspondence without changing the band. However, the switch 48 can change the band between the reception beams and the transmission beams with the subchannel as the minimum variable band. Moreover, the switch 48 can also divide and combine bands.

Next, returning to FIG. 4, the satellite transmitter 1 side is described. Each of the excitation coefficient multiplication units 11a to 11d included in the DBF transmission unit 2 forms a beam by multiplying a signal obtained by demultiplexing the relay signal 51 into elements "k"=1 to K by the excitation coefficient. The excitation coefficient to be multiplied by the excitation coefficient multiplication units 11a to 11d is the complex amplitude for each subchannel. The excitation coefficient is represented by the following Expression (2).

$$A^k = \left(A_0^k e^{j\theta_0^k} A_1^k e^{j\theta_1^k} A_2^k e^{j\theta_2^k} \cdots A_{N-1}^k e^{j\theta_{N-1}^k}\right)^T \quad (2)$$

In Expression (2), Akn and θkn each represent the following.

Akn: Amplitude of the excitation coefficient with respect to a subchannel "n" of element k Θkn: Phase of the excitation coefficient with respect to a subchannel "n" of element k As the output of the excitation coefficient multiplication units 11a to 11d, the complex amplitude after multiplication by the excitation coefficient for the element "k" is as shown in the following Expression (3).

$$X^k = A^k \circ X \quad (3)$$
$$= \left(X_0 A_0^k e^{j\theta_0^k} X_1 A_1^k e^{j\theta_1^k} \cdots X_{N-1} A_{N-1}^k e^{j\theta_{N-1}^k}\right)^T$$

The "circle" symbol shown in Expression (3) represents the Hadamard product of the vector. The sum of the complex amplitude vectors with respect to the element "k" as a result determines the spatial beam shape.

The excitation coefficient calculation unit 20 outputs the excitation coefficient to the excitation coefficient multiplication units 11a to 11d. In the excitation coefficient calculation unit 20, a phase calculation of the excitation coefficient as shown in the following Expression (4) is performed.

$$\theta_n^k = \varphi_{n,m}^k + \psi_m \quad (4)$$

In Expression (4), $\varphi_{n,m}^k$ represents the excitation coefficient phase of the element "k" forming the beam "m" of the subchannel "n" at the phase for performing beam formation. The excitation coefficient phase $\varphi_{n,m}^k$ is given to the excitation coefficient calculation unit 20 from the storage device 17 as beam formation information. Together with the amplitude $A_{0,m}^k$ of the excitation coefficient, the beam-formation excitation coefficient is represented by the following Expression (5).

$$A_{beam}^k = \left(A_{0,m}^k e^{j\phi_{0,m}^k} A_{1,m}^k e^{j\phi_{1,m}^k} A_{2,m}^k e^{j\phi_{2,m}^k} \cdots A_{N-1,m}^k e^{j\phi_{N-1,m}^k}\right)^T \quad (5)$$
$$= (A_1^k A_2^k A_3^k \cdots A_M^k)^T$$

Here, the cluster, which is a set of the excitation coefficients of the subchannels forming the beam "m", is represented by a vector $A_m^k$.

The beam-formation excitation coefficient may be conceivably set from the ground satellite control station 54. Specifically, as illustrated in FIG. 3 and FIG. 4, the beam-formation excitation coefficient can be set in each of the storage device 49 included in the satellite receiver 31 and in the storage device 17 included in the satellite transmitter 1, by transmitting a command from the ground satellite control station 54 to the satellite relay device 200.

In the example of FIG. 4, the command transmitted from the ground satellite control station 54 is received by the command reception antenna 56 arranged in the satellite relay device 200, and is then stored as the beam-formation excitation coefficient in each of the storage device 49 and the storage device 17. At this time, as illustrated in FIG. 4, there may be provided such a function that an excitation coefficient for transmission and an excitation coefficient for reception are appropriately distributed via the satellite control unit 60 and set in the satellite transmitter 1 and the satellite receiver 31.

Further, ψm in Expression (4) is the beam-to-beam relative phase, and is given to the excitation coefficient calculation unit 20 from the beam-to-beam relative phase calculation unit 19.

The beam-to-beam relative phase φm is the relative phase between the beam 1 and the beam "m". Therefore, the beam-to-beam relative phase ψm has the same value among the subchannels of the same beam, and also has the same value among the elements of the same subchannel.

Summarizing the above, the excitation coefficient $A^k$ of the element "k" output from the excitation coefficient calculation unit 20 to the excitation coefficient multiplication units 11a to 11d can be represented as in the following Expression (6).

$$A^k = \left(A_0^k e^{j\theta_0^k} A_1^k e^{j\theta_1^k} A_2^k e^{j\theta_2^k} \cdots A_{N-1}^k e^{j\theta_{N-1}^k}\right)^T \quad (6)$$

-continued $$= \left(A_{0,m}^k e^{j(\phi_{0,m}^k + \psi_m)} A_{1,m}^k e^{j(\phi_{1,m}^k + \psi_m)} \ldots A_{N-1,m}^k e^{j(\phi_{N-1,m}^k + \psi_m)}\right)^T$$

$$= (A_1^k \, A_2^k e^{j\psi_2} \, A_3^k e^{j\psi_3} \, \ldots \, A_M^k e^{j\psi_M})^T$$

Comparing Expression (5) and Expression (6), it can be seen that the beam-to-beam relative phase ψm is added as a surplus phase in Expression (6). However, there is no change in the phase difference among the elements for the same subchannel. Further, there is no change in the phase difference among the subchannels forming the same beam. Therefore, the beam to be formed is the same for Expression (5) and Expression (6).

The relay signals output from the excitation coefficient multiplication units 11a to 11d are input to the multiplexing units 12a to 12d. The multiplexing units 12a to 12d have a function of multiplexing the output signals of the excitation coefficient multiplication units 11a to 11d on the frequency axis and converting the multiplexed signals to real-time digital signals. That is, the multiplexing units 12a to 12d convert spectral data based on the resolution of the band Δfch to a real-time digital signal through inverse fast Fourier transformation.

The real-time digital signals output from the multiplexing units 12a to 12d are input to the DACs 13a to 13d. The DACs 13a to 13d perform DA conversion of the real-time digital signals. As a result, the outputs of the DACs 13a to 13d are converted to real-time analog signals.

The outputs of the DACs 13a to 13d are input to the amplifiers 14a to 14d. The amplifiers 14a to 14d have a function of amplifying the real-time analog signals output from the DACs 13a to 13d. In the satellite relay device 200, for example, a traveling wave tube amplifier (TWTA) is used as the amplifiers 14a to 14d.

The amplifiers 14a to 14d have a non-linear characteristic region, and the amplifiers 14a to 14d include a backoff in order to avoid the non-linear distortion generated in this region. When the PAPR can be suppressed, the amount of such backoff can be reduced, leading to an improvement in the power output from the amplifiers.

The outputs of the amplifiers 14a to 14d are emitted into the air by transmission antenna elements 15a to 15d configured as K elements #1 to #K, and transmission beams 16a to 16d are spatially formed.

In the satellite transmitter 1 according to the first embodiment, separately from the function of transmitting the relay signal 51 to the ground, a part of the power of the real-time data output from the multiplexing units 12a to 12d is extracted, and the extracted power is input to the PAPR calculation unit 18. The PAPR calculation unit 18 calculates the average power and the peak power of the real-time digital signal of each element at specific time intervals. As a result, the PAPR calculation unit 18 calculates and compares the PAPR of each element.

The beam-to-beam relative phase calculation unit 19 calculates the beam-to-beam relative phase ψm of Expression (4) based on the information on the PAPR of each element calculated by the PAPR calculation unit 18. The beam-to-beam relative phase ψm calculated by the beam-to-beam relative phase calculation unit 19 is output to the excitation coefficient calculation unit 20. Further, the beam-to-beam relative phase calculation unit 19 instructs the PAPR calculation unit 18 to update the PAPR measurement as required.

Figure 6:
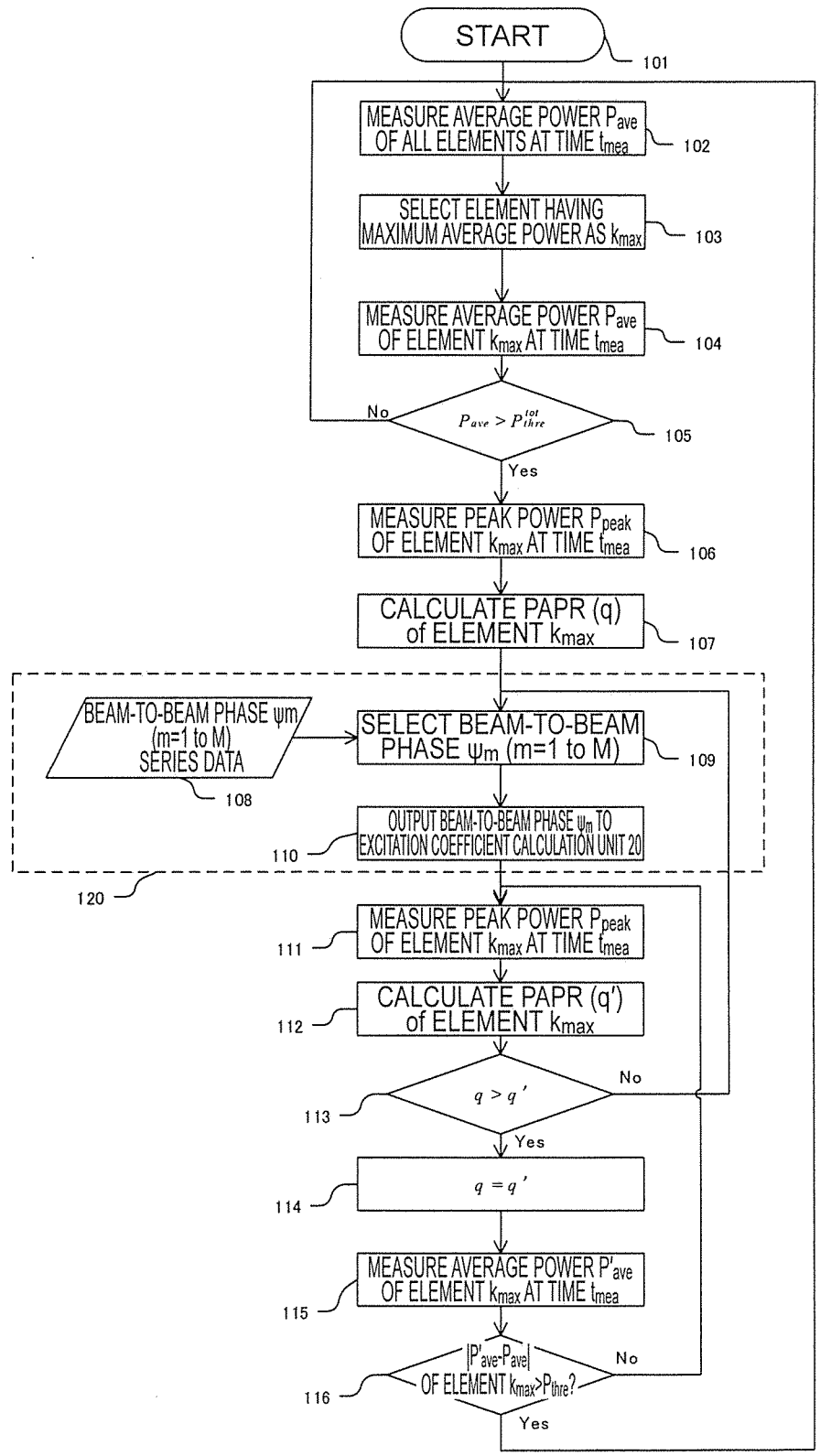
FIG. 6 is a flowchart for illustrating a series of processing steps to be executed in a PAPR calculation unit and a beam-to-beam relative phase calculation unit in the first embodiment of the present invention.

FIG. 6 is a flowchart for illustrating a series of processing steps to be executed in the PAPR calculation unit 18 and the beam-to-beam relative phase calculation unit 19 in the first embodiment of the present invention. First, in Step S101, a part of the output data of the multiplexing units 12a to 12d is input to the PAPR calculation unit 18, and a series of operations is started.

Figure 7:
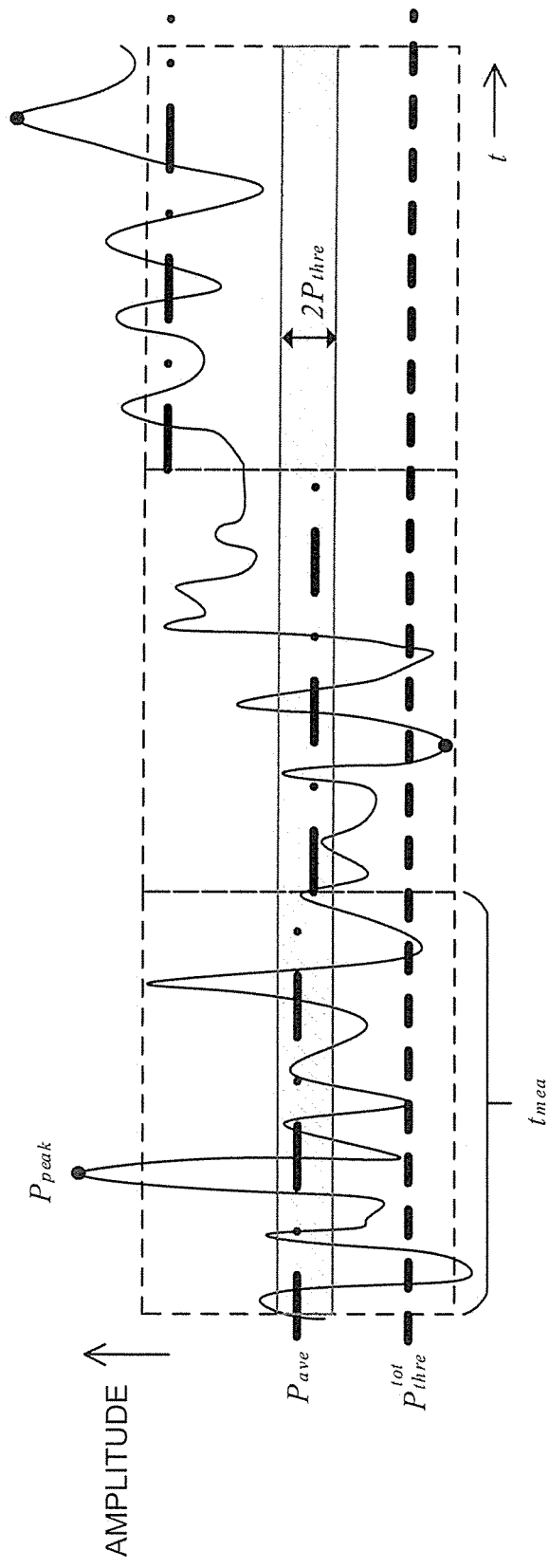
FIG. 7 is a diagram for illustrating an outline of a real-time signal input to the PAPR calculation unit in the first embodiment of the present invention.

FIG. 7 is a diagram for showing an outline of the real-time signal input to the PAPR calculation unit 18 in the first embodiment of the present invention. The PAPR calculation unit 18 performs the processing from Step S102 and subsequent steps based on the waveform of FIG. 7.

Next, in Step S102, the PAPR calculation unit 18 measures the average power $P_{ave}$ of all the elements while averaging the real-time signals at a time $t_{mea}$. Next, in Step S103, the PAPR calculation unit 18 selects the element having the largest average power $P_{ave}$ as $k_{max}$.

Next, in Step S104, the PAPR calculation unit 18 measures the average power $p_{ave}$ within the time $t_{mea}$ for the selected element $k_{max}$. Then, in Step S105, the PAPR calculation unit 18 compares the average power $p_{ave}$ of the element $k_{max}$ with a specific power threshold value $p_{thre}^{tot}$.

As the threshold value $p_{thre}^{tot}$, for example, a backoff of the amplifier is assumed to be about 10 dB. That is, when the average power $p_{ave}$ is sufficiently lower than the non-linear region of the amplifier, it is not required to suppress the PAPR. Therefore, when the average power $p_{ave}$ is equal to or less than the threshold value $p_{thre}^{tot}$, it is not required to perform the loop from Step S106 and subsequent steps for calculating the phase for suppressing PAPR, and the processing returns to Step S102.

Meanwhile, when the average power $p_{ave}$ is larger than the threshold value $p_{thre}^{tot}$, the processing advances to Step S106 and subsequent steps. In Step S106, the PAPR calculation unit 18 measures the peak power $P_{peak}$ within the time $t_{mea}$ for the selected element $k_{max}$.

Next, in Step S107, the PAPR calculation unit 18 calculates the PAPR of the element $k_{max}$ as PAPR (q) based on the average power $p_{ave}$ measured in Step S104 and the peak power $P_{peak}$ measured in Step S106.

Next, in Step S120, the beam-to-beam relative phase calculation unit 19 sets the beam-to-beam relative phase ψm (m=1 to M), and outputs the setting results to the excitation coefficient calculation unit 20. This Step S120 is composed of Step S108 to Step S110. In Step S120, the beam-to-beam relative phase ψm is selected and read out from data stored in advance as several pieces of series data.

Specifically, in Step S108, the beam-to-beam relative phase calculation unit 19 stores the beam-to-beam relative phase ψ1 to the beam-to-beam relative phase ψm as a plurality of pieces of series data in advance.

Next, in Step S109, the beam-to-beam relative phase calculation unit 19 executes selection processing of selecting one of the beam-to-beam relative phase ψ1 to the beam-to-beam relative phase ψM from the series data based on the PAPR (q) calculated by the PAPR calculation unit 18. Further, in Step S110, the beam-to-beam relative phase calculation unit 19 outputs the selected beam-to-beam relative phase ψ1 to beam-to-beam relative phase ψM to the excitation coefficient calculation unit 20.

The information and traffic, for example, transmitted by the transmission beams may change from moment to moment, and thus it is difficult to always determine the appropriate beam-to-beam relative phase. Therefore, as illustrated in Step S120, the satellite receiver 1 in the first embodiment prepares beam-to-beam relative phases as a plurality of pieces of series data, and performs update processing by changing and confirming each excitation coefficient in series data units. As a result, when an excitation coefficient is not appropriate, a more appropriate excitation coefficient is sequentially calculated by selecting another piece of the series data and updating each excitation coefficient.

When the beam-to-beam relative phase ψ1 to beam-to-beam relative phase ψM selected by the beam-to-beam relative phase calculation unit 19 in Step S120 are received, the excitation coefficient calculation unit 20 calculate a new excitation coefficient based on the reception results as the updated excitation coefficient. Then, the excitation coefficient calculation unit 20 outputs the newly calculated updated excitation coefficient to the excitation coefficient multiplication units 11a to 11d.

Through updating of the excitation coefficient to be given to the excitation coefficient multiplication units 11a to 11d, the relay signal output from the excitation coefficient multiplication units 11a to 11d and the real-time digital signal obtained by the multiplexing units 12a to 12d are also updated. Therefore, in Step S111, the PAPR calculation unit 18 measures the average power $p_{ave}$ and the peak power $P_{peak}$ again.

Next, in Step S112, the PAPR calculation unit 18 recalculates the PAPR of the element $k_{max}$ as PAPR (q') based on the measurement results of Step S111. Further, in Step S113, the PAPR calculation unit 18 compares PAPR (q) and PAPR (q'). Here, PAPR (q) corresponds to the PAPR before the update, and PAPR (q') corresponds to the PAPR after the update.

At this time, when the PAPR (q) which is the PAPR before setting the beam-to-beam relative phase ψm is equal to or less than the PAPR (q'), which is the PAPR after setting the beam-to-beam relative phase ψm, this means that the set beam-to-beam relative phase ψm is not suitable for PAPR suppression. Therefore, in this case, the processing returns to Step S120, and a new beam-to-beam relative phase ψm is set.

Meanwhile, when "PAPR (q)>PAPR (q')" holds, that is, when PAPR decreases by the selection of beam-to-beam relative phase ψm, the processing advances to Step S114. Then, in Step S114, the PAPR calculation unit 18 updates the value of "q" to q'. That is, PAPR (q) is updated to PAPR (q') corresponding to the updated PAPR.

Then, in Step S115, the PAPR calculation unit 18 again measures the average power $P_{ave}$ within the time $t_{mea}$. Next, in Step S116, the PAPR calculation unit 18 determines whether or not the absolute value of the difference between the average power $P_{ave}$ of the element $k_{max}$ measured in Step S104 and the average power $P'_{ave}$ of the element $k_{max}$ measured in Step S115 exceeds a threshold value $P_{thre}$. The threshold value $P_{thre}$ is a value set in advance as a threshold value of a specific power difference.

When the absolute value of this difference does not exceed the threshold value $P_{thre}$, the processing returns to Step S111, and optimization of the beam-to-beam relative phase is continued. Meanwhile, when the absolute value of this difference exceeds the threshold value, it can be considered that at least one of a channel setting, a beam setting, and a traffic amount of the relay signal 51 input to the satellite transmitter 1 has changed.

In this case, the power transmitted from each element also changes, and therefore $k_{max}$ is selected again. That is, in this case, the processing returns to Step S102, and the element having the maximum average power is selected again. Through sequential execution of such a series of operations, update processing of updating the beam-to-beam relative phase ψm is executed, and the PAPR is suppressed.

It is desired that the time $t_{mea}$ illustrated in FIG. 6 and FIG. 7 be sufficiently long with respect to the band of the relay signal 51. Further, the threshold value $P_{thre}$ shown in Step S116 of FIG. 6 is required to be appropriately selected in accordance with the modulation method and band of the relay signal 51. The time $t_{mea}$ and the threshold value $P_{thre}$ may be changed by transmitting a command from the ground as setting information, or may be determined in advance in the satellite relay device 200.

Further, in the flowchart illustrated in FIG. 6, there is described a case in which the optimum series data is retrieved by holding in advance a plurality of types of series data of the beam-to-beam relative phase ψ1 to the beam-to-beam relative phase ψM and sequentially selecting one piece of series data from among the held plurality of types of series data. However, in place of sequentially selecting one piece of series data from a plurality of series data set in advance, there may be used a method of sequentially generating a random phase series and setting the data as one piece of series data.

Even in methods other than the method of FIG. 6, as long as the PAPR is calculated and the beam-to-beam relative phase ψm is updated in accordance with the calculated PAPR, the PAPR can be suppressed based on feedback. That is, the satellite transmitter 1 according to the first embodiment has a feature of having a feedback configuration of updating the excitation coefficient based on the outputs of the multiplexing units 12a to 12d so that the PAPR of the inputs to the amplifiers 14a to 14d decrease. As a result, it is possible to reduce the backoff margin, improve the power of the transmitter, and expect an increase in communication traffic.

<Effects>

The satellite transmitter according to the first embodiment and the relay satellite communication system including the satellite transmitter produces the following effects when compared with the related art.

(Effect 1) It is possible to secure a dynamic range by suppressing the PAPR even when a satellite-mounted DAC having a small number of resolution bits is used.

(Effect 2) It is possible to suppress the peak power and increase the transmission power by reducing the back-off margin of the amplifier by suppressing the PAPR.

(Effect 3) Each beam is a communication signal having a separate frequency and different information. Therefore, the relative phases among the beams do not affect the demodulation of the other beams, and it is not required for the terrestrial receiving station side to share the phases assigned to the clusters in the satellite relay device.

(Effect 4) Real-time traffic fluctuation can be followed by beam-to-beam relative phase control implemented by the feedback configuration.

Second Embodiment

<Configuration>

Figure 8:
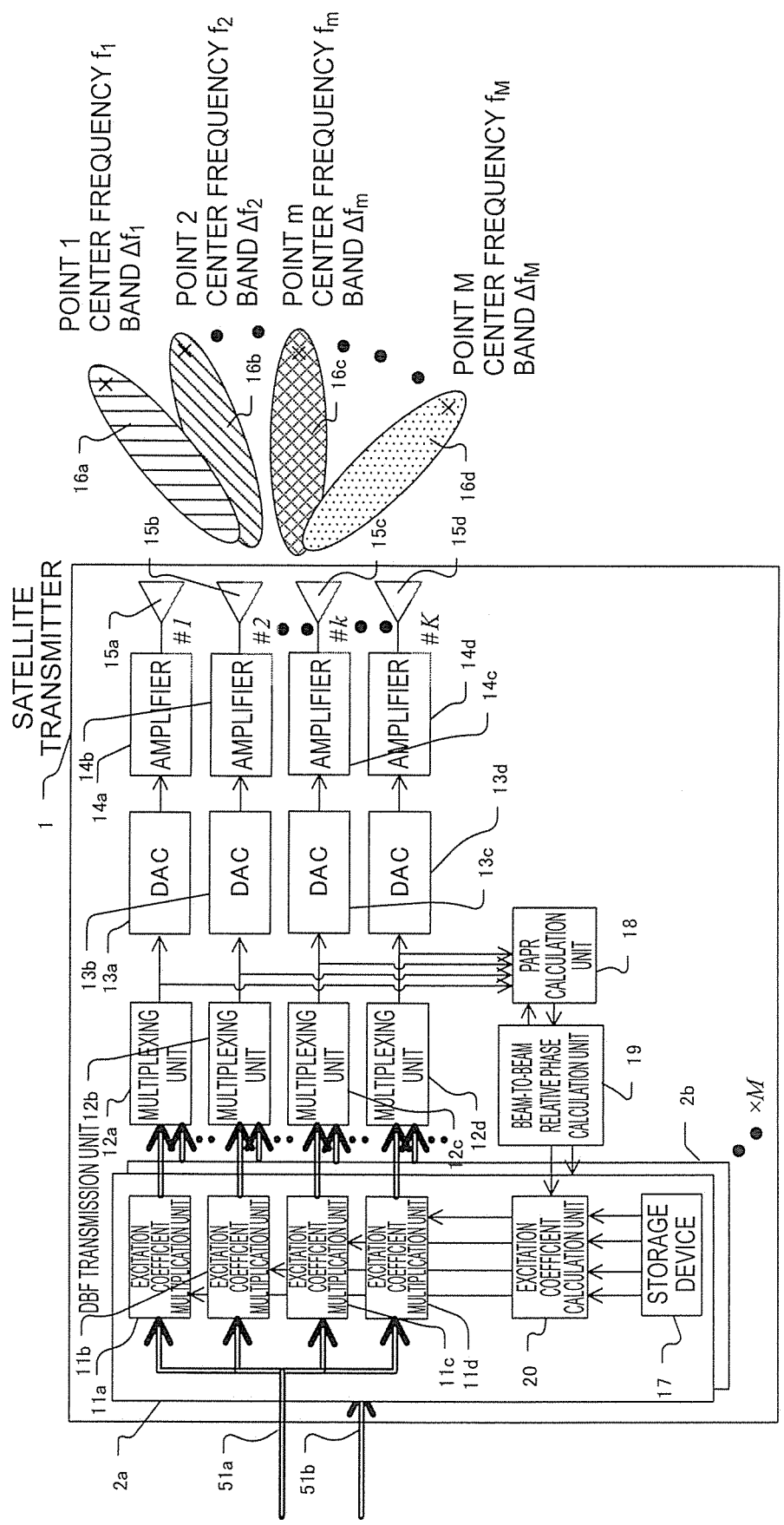
FIG. 8 is a diagram for illustrating an internal configuration of a satellite transmitter according to a second embodiment of the present invention.

FIG. 8 is a diagram for illustrating an internal configuration of a satellite transmitter according to a second embodiment of the present invention. The basic configuration is the same as that illustrated in FIG. 1 in the first embodiment described above. In FIG. 8, the differences from the configuration of FIG. 1 in the first embodiment are as follows. That is, in the first embodiment, the frequencies of the respective transmission beams are exclusive, and one DBF transmission unit 2 is provided for the satellite transmitter.

However, in the second embodiment, each transmission beam is spatially exclusive, and a plurality of M DBF transmission units 2a and 2b are arranged. The number M is set in accordance with the number of beams M to be transmitted. That is, in the second embodiment, there are M DBF transmission units 2 corresponding to the number of beams M to be transmitted. This difference is mainly described below.

Each of the transmission beams 16 to 16d has the following meaning as in the first embodiment described above.

Transmission beam 16a: Transmission beam to point 1
Transmission beam 16b: Transmission beam to point 2
Transmission beam 16c: Transmission beam to point m
Transmission beam 16d: Transmission beam to point M In the first embodiment described above, the ground reception points and transmission beams may be configured in any manner. However, in the second embodiment, the ground reception points and the transmission beams are exclusive. That is, in the second embodiment, the ground reception points are selected such that sufficient isolation for forming the transmission beams can be secured. The amount of isolation to be secured is required from an allowable value of a carrier-to-interference ratio (C/I) in the design of the communication line.

Each of the DBF transmission units 2a and 2b includes excitation coefficient multiplication units 11a to 11d, an excitation coefficient calculation unit 20, and a storage device 17. Further, the relay signal 51 is also individually input to each of the DBF transmission units 2a and 2b for each transmission beam. That is, a relay signal 51a is input to the DBF transmission unit 2a, and a relay signal 51b is input to the DBF transmission unit 2b. Although not shown in FIG. 8, the same configuration is applied to beams other than the relay signals 51a and 51b.

All of the processing subsequent to that of the multiplexing units 12a to 12d and the processing by the feedback configuration using the PAPR calculation unit 18 and the beam-to-beam relative phase calculation unit 19 are the same those of as the configuration of FIG. 1.

<Operation>

Next, the specific operation of the satellite transmitter 1 according to the second embodiment is described. The specific operation is described under the following conditions.

There are 1 to M points, that is, M points simultaneously transmitting communication signals from the satellite transmitter 1.

There are 1 to K transmission antenna elements, that is, K transmission antenna elements 15a to 15d.

For the transmission beams 16a to 16d output as communication signals from the satellite transmitter 1, the center frequency of the beam transmitted to the point "m" is "fm", and the band is Δfm.

Point 1 to point M receiving the communication signals output from the satellite transmitter 1 are points on the ground covered by an emission pattern by the M transmission beams 16a to 16d. As described above, point 1 to point M, which are the ground reception points, and the transmission beams 16a to 16d may be configured in any manner in the first embodiment, but are exclusive in the second embodiment.

Figure 9:
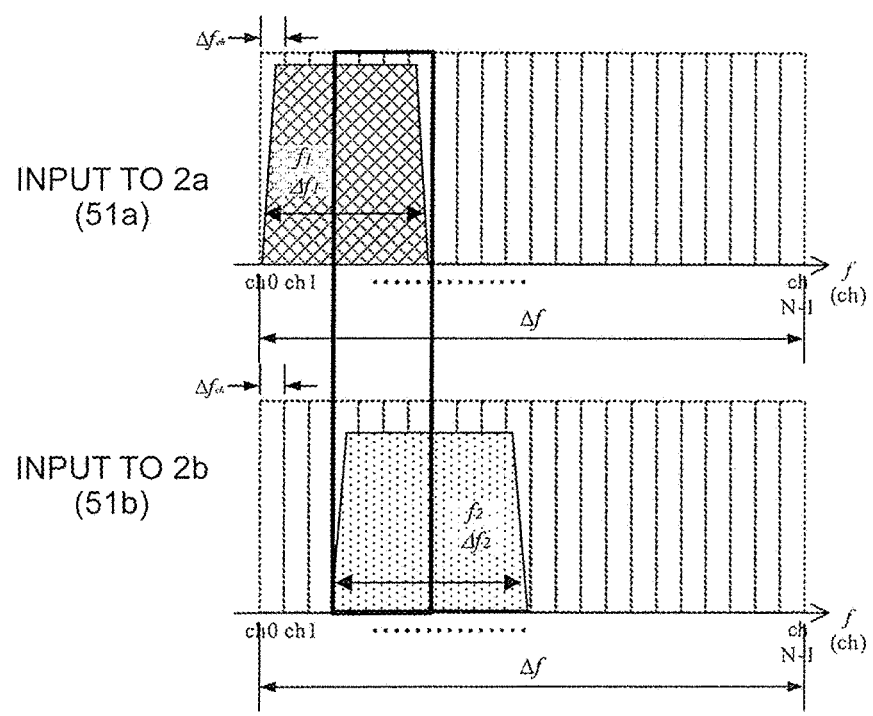
FIG. 9 is a schematic diagram of a relay signal input to the satellite transmitter according to the second embodiment of the present invention.

FIG. 9 is a schematic diagram of the relay signals 51a and 51b input to the satellite transmitter 1 according to the second embodiment of the present invention. Each of the relay signals 51a and 51b is a digital signal, and is a signal obtained by demultiplexing a signal having a total band Δf at a resolution of a band Δfch. The band Δfch having the minimum resolution is referred to as "sub-channel." Each sub-channel has a digital value for amplitude and phase. In the following description, the number of sub-channels is N channels.

In the first embodiment, all of the transmission beams 16a to 16d are included in one relay signal 51. However, in the second embodiment, the transmission beams 16a to 16d are input to different DBF transmission units 2a and 2b as different relay signals 51a and 51b for each beam. In other words, the transmission beam included in the relay signal 51a is input to the DBF transmission unit 2a, and the transmission beam included in the relay signal 51b is input to the DBF transmission unit 2b.

In the first embodiment, the transmission beams included in one relay signal 51 do not share the same subchannel. However, in the second embodiment, the frequency may be shared among the beams That is, as shown in FIG. 9, the same frequency may be used for the relay signal 51a and the relay signal 51b.

The relay signal 51a input to the DBF transmission unit 2a and the relay signal 51b input to the DBF transmission unit 2b are each multiplied by the excitation coefficient corresponding to the beam. That is, in the DBF transmission unit 2a, the excitation coefficient corresponding to a beam 1 is read out from the storage device 17. A beam-to-beam relative phase is given to the read excitation coefficient by the excitation coefficient calculation unit 20, and then multiplication processing is performed by the excitation coefficient multiplication units 11a to 11d.

In the DBF transmission unit 2b, the excitation coefficient corresponding to a beam 2 is read out from the storage device 17. A beam-to-beam relative phase is given to the read excitation coefficient by the excitation coefficient calculation unit 20, and then multiplication processing is performed by the excitation coefficient multiplication units 11a to 11d. The same processing is performed on the remaining M−2 DBF transmission units as well.

Each relay signal output from the M DBF transmission units 2 is input to the multiplexing units 12a to 12d arranged corresponding to the respective transmission antenna elements 15a to 15d. In the first embodiment, there is one input to each of the multiplexing units 2a to 2d. However, in the second embodiment, M relay signals corresponding to the number of beams are input to each of the multiplexing units 2a to 2d.

The multiplexing units 12a to 12d have a function of adding up the relay signals of all of the beams for each subchannel, and after adding up, multiplexing all of the subchannels on the frequency axis to convert the multiplexed signals to real-time digital signals. That is, the multiplexing units 12a to 12d convert spectral data based on the resolution of the band Δfch to a real-time digital signal by the IFFT.

The operations of the DACs 13a to 13d, the amplifiers 14a to 14d, the transmission antenna elements 15a to 15d, and the PAPR calculation unit 18, which are subsequent to the multiplexing units 12a to 12d, are the same as those in the first embodiment. Regarding the beam-to-beam relative phase calculation unit 19, in the first embodiment, a calculated beam-to-beam relative phase is given to a single DBF transmission unit 2. However, the beam-to-beam relative phase calculation unit 19 in the second embodiment is configured to give the same beam-to-beam relative phase to the excitation coefficient calculation units 20 included in the respective DBF transmission units 2a and 2b.

In the second embodiment, as a supplementary description, there is described a case in which the relay signal 51 is input from the satellite receiver 31. In this case, the number of DBF reception units 32 to be arranged for the configuration of the satellite receiver 31 illustrated in FIG. 4 corresponds to the number of reception beams Through adoption of such a configuration, the reception beams can be spatially exclusive like the transmission beams.

<Effects>

The satellite transmitter according to the second embodiment and the relay satellite communication system including the satellite transmitter produces the following effects when compared with the related art.

(Effect 1) It is possible to secure the dynamic range by suppressing the PAPR even when a satellite-mounted DAC having a small number of resolution bits is used.

(Effect 2) It is possible to suppress the peak power and increase the transmission power by reducing the back-off margin of the amplifier by suppressing the PAPR.

(Effect 3) Each beam is spatially separate. Therefore, the relative phases among the beams do not affect the demodulation of the other beams, and it is not required for the terrestrial receiving station side to share the phases assigned to the clusters in the satellite relay device.

(Effect 4) The relay signal may use the same frequency among beams, and hence frequency usage efficiency is improved.

(Effect 5) Real-time traffic fluctuation can be followed by beam-to-beam relative phase control implemented by the feedback configuration.

Third Embodiment

<Configuration>

In the first and second embodiments, PAPR calculation processing is performed in the satellite transmitter 1 of the satellite relay device 200, and feedback control processing of updating the excitation coefficient is performed based on the calculation result of the PAPR. However, in a third embodiment of the present invention, there is described a case in which the PAPR calculation processing and the feedback control processing of updating the excitation coefficient are performed on the ground side.

When traffic information, for example, the number and band of relay signals transmitted from the satellite relay device 200 to the ground and the directivity direction of the beam are determined in advance on the ground transmission station side, the element having the maximum PAPR can be calculated on the ground. Therefore, in this case, there can be adopted a configuration in which the PAPR calculation unit and the beam-to-beam relative phase calculation unit are arranged on the ground side, and the beam-to-beam relative phase $\psi m$ is given to the satellite relay device 200 based on a command from the ground.

Figure 10:
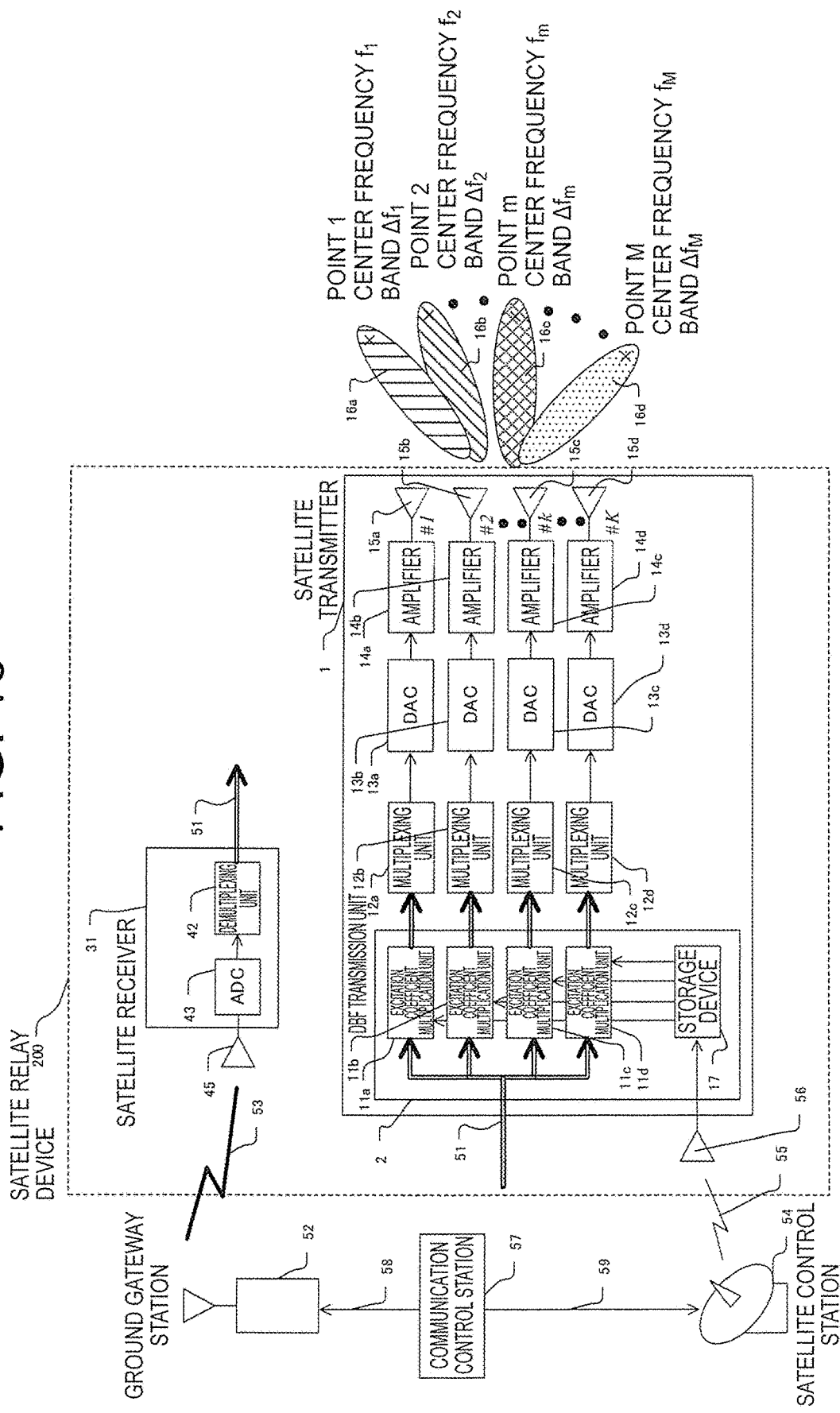
FIG. 10 is a diagram for illustrating a configuration example of a relay satellite communication system including a satellite relay device according to a third embodiment of the present invention.

FIG. 10 is a diagram for illustrating a configuration example of a relay satellite communication system including a satellite relay device 200 in the third embodiment of the present invention. Similarly to the first embodiment, the purpose of the satellite transmitter 1 included in the satellite relay device 200 in the third embodiment illustrated in FIG. 10 is to simultaneously transmit transmission beams 16a to 16d as communication signals to one or more points "m".

Each of the transmission beams 16 to 16d has also the following meaning as in the first embodiment described above.

Transmission beam 16a: Transmission beam to point 1
Transmission beam 16b: Transmission beam to point 2
Transmission beam 16c: Transmission beam to point m
Transmission beam 16d: Transmission beam to point M Similarly to the first embodiment, point 1 to point M for receiving the communication signals output from the satellite transmitter 1 may be any points on the ground covered by the emission pattern by the M transmission beams 16a to 16d. Further, it is assumed that the transmission beams 16a to 16d do not have overlapping frequencies. That is, as in the first embodiment, it is assumed that the frequencies of the transmission beams 16a to 16d in the third embodiment are exclusive to each other.

In the first and second embodiments, the PAPR calculation unit 18 and the beam-to-beam relative phase calculation unit 19 for suppressing the PAPR are arranged in the satellite transmitter 1. However, in the third embodiment, the PAPR calculation unit 18 and the beam-to-beam relative phase calculation unit 19 are not arranged in the satellite transmitter 1. Instead, a communication control station 57 on the ground is configured to calculate a phase for reducing the PAPR, and the setting value of the excitation coefficient to be updated is transmitted as a command to the satellite relay device 200 via the ground satellite control station 54.

<Operation>

The operation of the satellite relay device 200 is the same as that in the first embodiment except that the PAPR calculation unit 18 and the beam-to-beam relative phase calculation unit 19 are not included, and therefore description thereof is omitted here.

Figure 11:
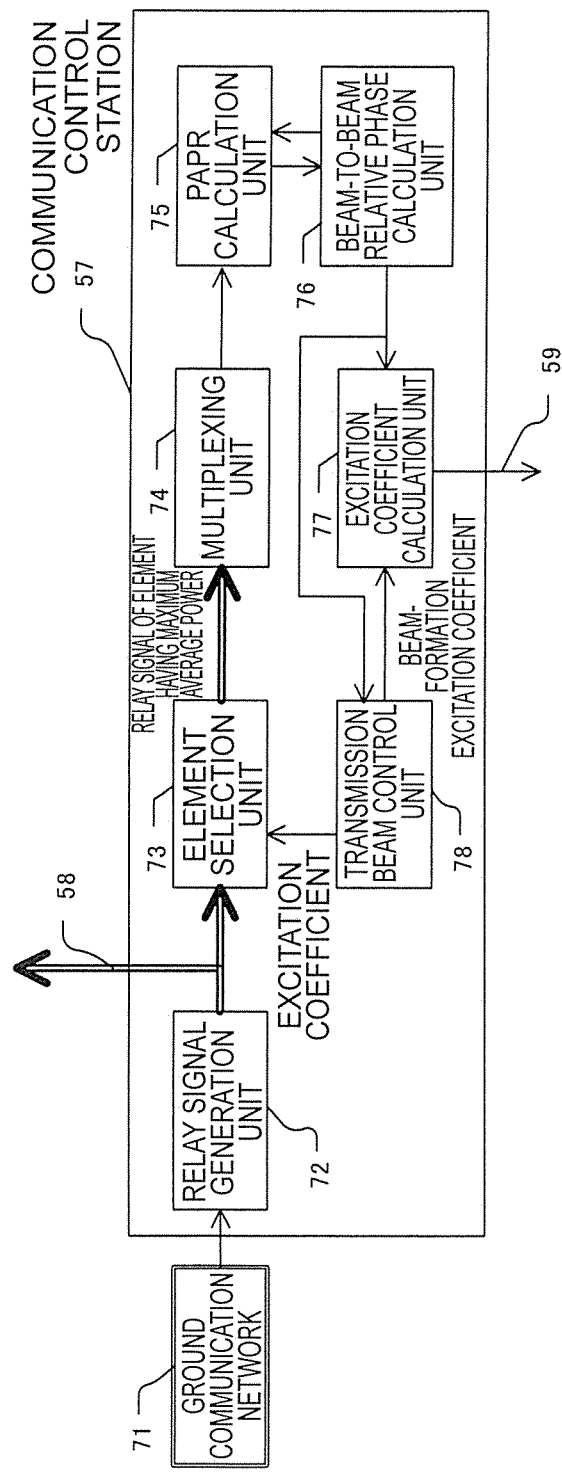
FIG. 11 is a schematic diagram of a communication control station in the third embodiment of the present invention.

FIG. 11 is a schematic view of the communication control station 57 in the third embodiment of the present invention. The communication control station 57 illustrated in FIG. 11 includes a relay signal generation unit 72, an element selection unit 73, a multiplexing unit 74, a PAPR calculation unit 75, a beam-to-beam relative phase calculation unit 76, an excitation coefficient calculation unit 77, and a transmission beam control unit 78.

In the communication control station 57, a signal to be relayed from a ground communication network 71 to another ground station via the satellite relay device 200 is input from the ground communication network 71. The relay signal generation unit 72 included in the communication control station 57 is configured to generate a relay signal as shown in FIG. 2 as a relay signal 58 based on the signal input from the ground communication network 71. The relay signal 58 is transmitted to the satellite relay device 200 as the relay signal 53 via the ground gateway station 52.

The element selection unit 73 is configured to input a part of the relay signal 58 generated by the relay signal generation unit 72. The element selection unit 73 generates simulated signals similar to the element signal generated by the DBF transmission unit 2 on the satellite relay device 200 by multiplying the beam-formation excitation coefficient given from the transmission beam control unit 78 and the relay signal 58. The element selection unit 73 selects the element having the highest power from among the element signals generated in a simulated manner, and outputs a relay signal which has been multiplied by the excitation coefficient of the selected element to the multiplexing unit 74.

The multiplexing unit 74 has a function of multiplexing the relay signal of the element having the highest average power on the frequency axis and converting the multiplexed relay signal to a real-time digital signal. That is, the multiplexing unit 74 is configured to convert spectral data based on the resolution of the band $\Delta fch$ to a real-time digital signal through inverse fast Fourier transformation.

The real-time digital signal output from the multiplexing unit 74 is input to the PAPR calculation unit 75. The PAPR calculation unit 75 is configured to measure the average power and the peak power at specific time intervals to calculate the PAPR. The PAPR information calculated by the PAPR calculation unit 75 is input to the beam-to-beam relative phase calculation unit 76.

The beam-to-beam relative phase calculation unit 76 is configured to select one beam-to-beam relative phase ψm based on the PAPR information. The processing by the beam-to-beam relative phase calculation unit 76 is the same as the processing performed in Step 120 of FIG. 6.

Information on the beam-to-beam relative phase ψm is transmitted from the beam-to-beam relative phase calculation unit 76 to the excitation coefficient calculation unit 77 and the transmission beam control unit 78. The transmission beam control unit 78 is configured to add the beam-formation excitation coefficient phase to the beam-to-beam relative phase ψm transmitted from the beam-to-beam relative phase calculation unit 76, and to then generate a new excitation coefficient. The transmission beam control unit 78 gives the generated new excitation coefficient to the element selection unit 73. As a result, the same series of processing steps is repeated by using the updated excitation coefficient.

The excitation coefficient calculation unit 77 is configured to add the beam-formation excitation coefficient phase and the beam-to-beam relative phase ψm, calculate the excitation coefficient $A^k$, and to transmit the calculated excitation coefficient $A^k$ to the ground satellite control station 54 as an excitation coefficient 59. The excitation coefficient 59 transmitted as the command signal 55 from the ground satellite control station 54 is set in the excitation coefficient multiplication units 11a to 11d included in the DBF transmission unit 2 via the storage device 17. As a result, in the relay satellite communication system including the configuration illustrated in FIG. 10, it is possible to form beams and to reduce the PAPR of the maximum power element.

Thus, the configuration in the satellite relay device 200 can be simplified by, on the communication control station 57 side, calculating a beam-to-beam relative phase for reducing the PAPR of the transmission antenna elements 15a to 15d of the satellite transmitter 1 in advance, and calculating an excitation coefficient $A^k$ combining the beam-formation excitation coefficient.

<Effects>

The relay satellite communication system according to the third embodiment produces the following effects when compared with the related art.
(Effect 1) It is possible to secure the dynamic range by suppressing the PAPR even when a satellite-mounted DAC having a small number of resolution bits is used.
(Effect 2) It is possible to suppress the peak power and increase the transmission power by reducing the back-off margin of the amplifier by suppressing the PAPR.
(Effect 3) The configuration of the satellite relay device can be simplified by calculating the phase for reducing the PAPR on the ground station side.
(Effect 4) Real-time traffic fluctuation can be followed by beam-to-beam relative phase control implemented by the feedback configuration.

Lastly, the technical features common to the above-mentioned first to third embodiments are summarized as follows. The beam-to-beam relative phase ψm is a parameter given to each transmission beam. Further, the beam-to-beam relative phase ψm is a parameter capable of manipulating the relative phase between the beams without affecting transmission beam formation itself.

The satellite transmitter and the relay satellite communication system according to the present invention have a configuration in which the beam-to-beam relative phase for suppressing the peak power of the transmission antenna element is calculated based on the calculation result of the PAPR, and the excitation coefficient is updated by using the calculated beam-to-beam relative phase. As a result, it is possible to achieve the satellite transmitter and the relay satellite communication system in which limitation of the transmission power is suppressed, and in which the phase control information is not required to be shared between the transmitter side and the receiver side.

The update processing of updating the excitation coefficient can be executed on the satellite transmitter side as described in the first and second embodiments, or on the ground side as described in the third embodiment.

REFERENCE SIGNS LIST 1 satellite transmitter, 2, 2a 2b DBF transmission unit, 11a-11d excitation coefficient multiplication unit, 12a-12d multiplexing unit, 13a-13d DAC, 14a-14d amplifier, 15a-15d transmission antenna element, 16a-16d transmission beam, 17 storage device, 18 PAPR calculation unit, 19 beam-to-beam relative phase calculation unit, 20 excitation coefficient calculation unit, 31 satellite receiver, 32 DBF reception unit, 42A-42D demultiplexing unit, 43A-43D ADC, 44A-44D amplifier, 45A-45D reception antenna element, 46A-46D reception beam, 47 vector combiner, 48 switch, 51, 51a, 51b relay signal, 52 ground gateway station, 53 relay signal, 54 ground satellite control station, 55 command signal, 56 command reception antenna, 57 communication control station, 58 relay signal, 59 excitation coefficient, 60 satellite control unit, 71 ground communication network, 72 relay signal generation unit, 73 element selection unit, 74 multiplexing unit, 75 PAPR calculation unit, 76 beam-to-beam relative phase calculation unit, 77 excitation coefficient calculation unit, 78 transmission beam control unit, 200 satellite relay device

The invention claimed is:
1. A satellite transmitter, comprising:
K transmission antenna elements configured to emit transmission beams each having a different frequency from each other to any of one or more points on ground based on each of K analog signals;
a multiplexing circuitry configured to multiplex, by using K digital signals of a frequency domain demultiplexed for each frequency as inputs, each of the K digital signals on a frequency axis and then convert the multiplexed digital signals to time-domain digital signals, the number K corresponding to the number of the transmission antenna elements;
a digital-to-analog converter configured to convert each of the K digital signals to the analog signal;
a storage device configured to store K excitation coefficients for forming the transmission beams as beam-formation excitation coefficients;
a PAPR calculating circuitry configured to calculate, as a PAPR, a peak-to-average power ratio for each of the K digital signals converted by the multiplexing circuitry;
a beam-to-beam relative phase calculating circuitry configured to calculate a beam-to-beam relative phase for suppressing a peak power of the transmission antenna elements based on the K PAPRs;
an excitation coefficient calculating circuitry configured to calculate K updated excitation coefficients based on the beam-to-beam relative phase and the beam-formation excitation coefficients; and an excitation coefficient multiplying circuitry configured to generate the digital signals of the frequency domain to be output to the multiplexing circuitry by multiplying a received relay signal by each of the K updated excitation coefficients in the frequency domain, wherein K is an integer of 1 or more.

2. The satellite transmitter according to claim 1, further comprising an amplifier configured to amplify the K analog signals output from the digital-to-analog converter and to output the amplified K analog signals to the K transmission antenna elements.

3. The satellite transmitter according to claim 2, wherein the beam-to-beam relative phase calculating circuitry is configured to:

calculate the beam-to-beam relative phase for suppressing the peak power of the transmission antenna elements by executing selection processing of selecting one beam-to-beam relative phase from a plurality of beam-to-beam relative phases stored in advance based on a calculation result obtained by the PAPR calculating circuitry;

execute update processing of updating the excitation coefficients by outputting the selected one beam-to-beam relative phase to the excitation coefficient calculating circuitry to cause the excitation coefficient calculating circuitry to calculate the K-updated excitation coefficients; and execute update processing of updating the beam-to-beam relative phase for suppressing the peak power of the transmission antenna elements by sequentially executing the selection processing so that the PAPR becomes smaller by comparing the PAPR before updating which is calculated by the PAPR calculating circuitry before the update processing is executed and the PAPR after updating which is calculated by the PAPR calculating circuitry after the update processing is executed.

4. The satellite transmitter according to claim 1, wherein the beam-to-beam relative phase calculating circuitry is configured to:

calculate the beam-to-beam relative phase for suppressing the peak power of the transmission antenna elements by executing selection processing of selecting one beam-to-beam relative phase from a plurality of beam-to-beam relative phases stored in advance based on a calculation result obtained by the PAPR calculating circuitry;

execute update processing of updating the excitation coefficients by outputting the selected one beam-to-beam relative phase to the excitation coefficient calculating circuitry to cause the excitation coefficient calculating circuitry to calculate the K-updated excitation coefficients; and execute update processing of updating the beam-to-beam relative phase for suppressing the peak power of the transmission antenna elements by sequentially executing the selection processing so that the PAPR becomes smaller by comparing the PAPR before updating which is calculated by the PAPR calculating circuitry before the update processing is executed and the PAPR after updating which is calculated by the PAPR calculating circuitry after the update processing is executed.

5. A satellite transmitter, comprising:

K transmission antenna elements configured to emit transmission beams to M points spatially different on ground based on each of K analog signals;

a multiplexing circuitry configured to multiplex, by using K digital signals of a frequency domain demultiplexed for each frequency as inputs, each of the K digital signals on a frequency axis and then convert the multiplexed digital signals to time-domain digital signals, the number K corresponding to the number of the transmission antenna elements;

a digital-to-analog converter configured to convert each of the K digital signals to the analog signal;

a storage device configured to store K excitation coefficients for forming the transmission beams as beam-formation excitation coefficients;

a PAPR calculating circuitry configured to calculate, as a PAPR, a peak-to-average power ratio for each of the K digital signals converted by the multiplexing circuitry;

a beam-to-beam relative phase calculating circuitry configured to calculate a beam-to-beam relative phase for suppressing a peak power of the transmission antenna elements based on the K PAPRs;

an excitation coefficient calculating circuitry configured to calculate K updated excitation coefficients based on the beam-to-beam relative phase and the beam-formation excitation coefficients; and an excitation coefficient multiplying circuitry configured to generate the digital signals of the frequency domain to be output to the multiplexing circuitry by multiplying a received relay signal by each of the K updated excitation coefficients in the frequency domain, wherein the satellite transmitter includes M DBF transmitting circuitry each including the storage device, the excitation coefficient calculating circuitry, and the excitation coefficient multiplying circuitry, wherein the relay signal is configured as individual M relay signals, wherein the M DBF transmitting circuitry is configured to output M digital signals of the frequency domain based on each of the individual M relay signals, wherein the multiplexing circuitry is configured to generate added-up K digital signals obtained by adding up the M digital signals of the frequency domain for each frequency, multiplex each of the added-up K digital signals on the frequency axis, and to then convert the multiplexed digital signals to time-domain digital signals, wherein the beam-to-beam relative phase calculating circuitry is configured to output the calculated beam-to-beam relative phase to each of the M DBF transmitting circuitry, and wherein K and M are integers of 1 or more.

6. The satellite transmitter according to claim 5, further comprising an amplifier configured to amplify the K analog signals output from the digital-to-analog converter and to output the amplified K analog signals to the K transmission antenna elements.

7. The satellite transmitter according to claim 6, wherein the beam-to-beam relative phase calculating circuitry is configured to:

calculate the beam-to-beam relative phase for suppressing the peak power of the transmission antenna elements by executing selection processing of selecting one beam-to-beam relative phase from a plurality of beam-to-beam relative phases stored in advance based on a calculation result obtained by the PAPR calculating circuitry;

execute update processing of updating the excitation coefficients by outputting the selected one beam-to-beam relative phase to the excitation coefficient calculating circuitry to cause the excitation coefficient calculating circuitry to calculate the K-updated excitation coefficients; and execute update processing of updating the beam-to-beam relative phase for suppressing the peak power of the transmission antenna elements by sequentially executing the selection processing so that the PAPR becomes smaller by comparing the PAPR before updating which is calculated by the PAPR calculating circuitry before the update processing is executed and the PAPR after updating which is calculated by the PAPR calculating circuitry after the update processing is executed.

8. The satellite transmitter according to claim 5, wherein the beam-to-beam relative phase calculating circuitry is configured to:

calculate the beam-to-beam relative phase for suppressing the peak power of the transmission antenna elements by executing selection processing of selecting one beam-to-beam relative phase from a plurality of beam-to-beam relative phases stored in advance based on a calculation result obtained by the PAPR calculating circuitry;

execute update processing of updating the excitation coefficients by outputting the selected one beam-to-beam relative phase to the excitation coefficient calculating circuitry to cause the excitation coefficient calculating circuitry to calculate the K-updated excitation coefficients; and execute update processing of updating the beam-to-beam relative phase for suppressing the peak power of the transmission antenna elements by sequentially executing the selection processing so that the PAPR becomes smaller by comparing the PAPR before updating which is calculated by the PAPR calculating circuitry before the update processing is executed and the PAPR after updating which is calculated by the PAPR calculating circuitry after the update processing is executed.

9. A relay satellite communication system, comprising:
a ground gateway station, a communication control station, and a ground satellite control station which are arranged on ground; and
a satellite relay device including a satellite receiver and a satellite transmitter,
wherein the communication control station is configured to:
generate a relay signal, and calculate for the generated relay signal, as a PAPR, a peak-to-average power ratio for each time-domain digital signal of each transmission antenna element arranged in the satellite transmitter;
calculate a beam-to-beam relative phase for suppressing a peak power of the transmission antenna elements based on the PAPR;
determine a beam-formation excitation coefficient of a transmission beam emitted from the satellite transmitter based on the beam-to-beam relative phase; and
calculate an updated excitation coefficient by updating the beam-formation excitation coefficient based on the beam-to-beam relative phase and the beam-formation excitation coefficient,
wherein the ground gateway station is configured to transmit the relay signal generated by the communication control station to the satellite receiver,
wherein the ground satellite control station is configured to transmit the updated excitation coefficient generated by the communication control station to the satellite transmitter,
wherein the satellite receiver is configured to generate a digital signal of a frequency domain demultiplexed for each frequency from the relay signal received from the ground gateway station,
wherein the satellite transmitter includes:
K transmission antenna elements configured to emit transmission beams each having a different frequency from each other to any of one or more points on the ground based on each of K analog signals;
a multiplexing circuitry configured to multiplex, by using K digital signals of an updated frequency domain as inputs, each of the K digital signals on a frequency axis and then convert the multiplexed digital signals to time-domain digital signals, the number K corresponding to the number of the transmission antenna elements;
a digital-to-analog converter configured to convert each of the K digital signals to the analog signal; and
an excitation coefficient multiplying circuitry configured to generate the digital signals of the updated frequency domain to be output to the multiplexing circuitry by receiving the updated excitation coefficient from the ground satellite control station and multiplying the digital signals of the frequency domain generated by the satellite receiver by the updated excitation coefficient in the frequency domain, and
wherein K is an integer of 1 or more.

10. The relay satellite communication system according to claim 9, further comprising an amplifier configured to amplify the K analog signals output from the digital-to-analog converter and to output the amplified K analog signals to the K transmission antenna elements.

11. The relay satellite communication system according to claim 10, wherein the communication control station is configured to:
calculate the beam-to-beam relative phase for suppressing the peak power of the transmission antenna elements by executing selection processing of selecting one beam-to-beam relative phase from a plurality of beam-to-beam relative phases stored in advance based on a calculation result of the PAPR;
execute update processing of calculating the updated excitation coefficient based on the selected one beam-to-beam relative phase; and
execute update processing of updating the beam-to-beam relative phase for suppressing the peak power of the transmission antenna elements by sequentially executing the selection processing so that the PAPR becomes smaller by comparing the PAPR before updating which is calculated before the update processing is executed and the PAPR after updating which is calculated after the update processing is executed.

12. The relay satellite communication system according to claim 9, wherein the communication control station is configured to:
calculate the beam-to-beam relative phase for suppressing the peak power of the transmission antenna elements by executing selection processing of selecting one beam-to-beam relative phase from a plurality of beam-to-beam relative phases stored in advance based on a calculation result of the PAPR;

execute update processing of calculating the updated excitation coefficient based on the selected one beam-to-beam relative phase; and execute update processing of updating the beam-to-beam relative phase for suppressing the peak power of the transmission antenna elements by sequentially executing the selection processing so that the PAPR becomes smaller by comparing the PAPR before updating which is calculated before the update processing is executed and the PAPR after updating which is calculated after the update processing is executed.

\* \* \* \* \*